No. 782,999. PATENTED FEB. 21, 1905.
A. A. VANDERPOOL.
TYPE WRITING MACHINE.
APPLICATION FILED APR. 23, 1904.
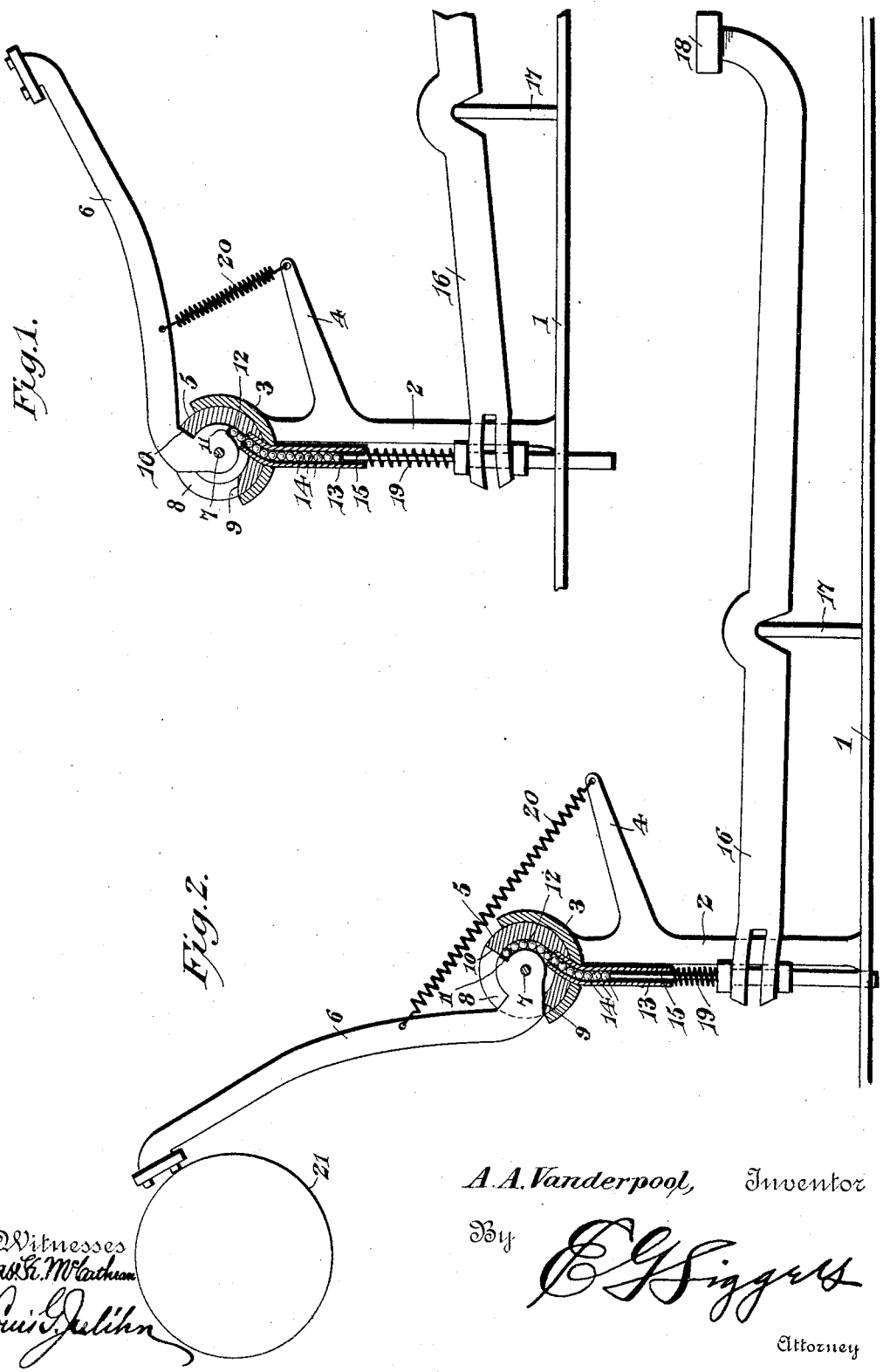
A. A. Vanderpool, Inventor
Witnesses No. 782,999. Patented February 21, 1905.

UNITED STATES PATENT OFFICE.

ALBION ALEXANDER VANDERPOOL, OF NEWARK, NEW JERSEY, ASSIGNOR TO ELLIOTT-FISHER COMPANY, OF NEW YORK, N. Y., A CORPORATION OF DELAWARE.

TYPE-WRITING MACHINE.

SPECIFICATION forming part of Letters Patent No. 782,999, dated February 21, 1905.

Application filed April 23, 1904. Serial No. 204,577.

*To all whom it may concern:*

Be it known that I, ALBION ALEXANDER VANDERPOOL, a citizen of the United States, residing at Newark, in the county of Essex and State of New Jersey, have invented a new and useful Type-Writing Machine, of which the following is a specification.

My present invention relates to an improvement in type-writing machines, and more particularly to a novel motion-transmitting means designed with special reference to the transmission of motion to a type-arm, but susceptible of many other applications.

By way of premise it may be stated that more or less difficulty has been encountered in effecting the transmission of motion in angular directions. A bell-crank lever or its equivalent has ordinarily been utilized for this purpose; but its use is open to several serious objections. In the first place the extent of movement is necessarily circumscribed, and in the second place the leverage necessarily varies, so that it is practically impossible to transmit movement at a uniform rate of speed.

The object of this invention is to produce simple, inexpensive, and efficient means for transmitting motion in angular or circuitous directions without a change of leverage or the various other objectionable characteristics of bell-crank or equivalent transmitting mechanisms.

To the accomplishment of this object the invention resides in interposing between the driving and driven elements a motion-transmitting mechanism including a bodily-movable series of disconnected contacting antifriction elements confined by guiding means and constituting a flexible section which may deflect or assume an angular or tortuous form in accordance with the direction or directions in which it is desired to transmit motion or to accommodate the relative disposition of the driving and driven elements.

Considered somewhat more specifically, the invention consists in the interposition between a key-lever and a type-arm of a type-writing machine a motion-transmitting mechanism including a series of antifriction-balls incased in a tubular casing having one end thereof deflected, so that the force exerted by the transmitting mechanism will be in a direction other than that in which the key-lever exerts its force upon the transmitting mechanism.

In the accompanying drawings, Figure 1 is a sectional elevation of a front-strike type-action embodying my invention. Fig. 2 is a similar view showing the parts in the position they assume when the type is moved into contact with the platen.

Like numerals are employed to designate corresponding parts in both views.

1 indicates the base of a type-writing machine frame, from which rises a type-arm bracket 2, formed at its upper end with a semicylindrical yoke 3, below which is a laterally-extending arm 4. Within the yoke 3 is fitted a circular bearing 5, within which the type-arm 6 is fulcrumed at 7. The bearing 5 is in the form of a narrow cylindrical casing having a peripheral slot 8, accommodating the movement of the type-arm, which is limited by the shoulders 9 and 10, formed by the end walls of the slot 8. The lower end of the arm 6, afforded a bearing in the member 5, is formed with a shoulder 11, disposed radially with respect to the fulcrum 7, the reduction of the arm to produce this shoulder defining between the arm and the outer wall of the member 5 a ball-race 12, constituting a continuation of a tubular conduit 13. The lower end of this conduit 13 is disposed vertically; but its upper end is deflected laterally and passed upwardly through the yoke 13 and the peripheral wall of the bearing 5, so as to dispose it at a tangent to the arcuate race 12. The race 12 and the conduit 3 constitute guiding means for the reception of a series of antifriction-balls 14, the ball located at the upper end of the series being disposed in contact with the shoulder 11 of the type-arm. The series of balls 14 is supported by a vertically-disposed plunger 15, having its upper end extended into the lower end of the conduit 13 and connected at a point below said conduit with the rear end of a key-lever 16, carried by the usual fulcrum-bar 17 and provided at its front extremity with a key 18. Encircling the plunger 15 and interposed between the lever 16 and the lower end of the conduit 13 is a key-lever-retracting spring 19, a type-arm-retracting spring 20 being connected at its opposite ends to the type-arm 6 and the arm 4 of the bracket 2.

21 indicates the platen shown in Fig. 2 of the drawings.

The operation of the mechanism described will be apparent from a comparison of Figs. 1 and 2. When the key 18 is depressed, the rear end of the lever 16 is elevated, thus causing the plunger 15 to impart endwise movement to the series of balls 14. As the uppermost ball bears against the shoulder 11 the type-arm will be swung into contact with the platen, the flexibility of the series of balls permitting it to conform to its circuitous or crooked guide, defined by the recess 12 and the tube 13, notwithstanding the change in form which is caused by the movement of the type-arm and the consequent prolongation of the race 12. As soon as the finger is removed from the key 18 the key-lever and the type-arm will be retracted by the springs 19 and 20 in an obvious manner.

It will now be seen that the key-lever and type-arm constitute driving and driven members between which is interposed a motion-transmitting mechanism including a flexible section made up of a series of antifriction-balls, suitably guided in accordance with the direction in which it is desired to transmit the movement. It will also be noted that by the interposition of this character of mechanism there will be no change of leverage incident to the change of relation of the driving and driven members during their movement, and, furthermore, that the movement of the driven element is not limited by the nature of the interposed mechanism, as is the case where a bell-crank lever is employed.

It is thought that from the foregoing the construction, operation, and advantages of my motion-transmitting mechanism will be fully comprehended; but it is to be distinctly understood that I do not limit myself to the structural details defined, since while the invention is particularly applicable for use in a type-action it is equally useful in other connections for the transmission of motion. I therefore reserve the right to effect such changes, modifications, and variations of the illustrated structure as may come clearly within the scope of the protection prayed.

What I claim is—

1. In a type-writer, the combination with a key a type-arm and a type-arm bearing, of motion-transmitting mechanism including an endwise-movable series of disconnected elements, and guiding means therefor formed in part by the type-arm bearing.

2. In a type-writer, the combination with a key and a type-arm, of interposed motion-transmitting mechanism including an endwise-movable series of individually rotary elements, and a crooked conduit therefor, formed in part by the type-arm.

3. In a type-writer, the combination with a key, a type-arm and a type-arm bearing, of motion-transmitting mechanism including an endwise-movable series of balls, and a conduit therefor, formed in part by the type-arm and its bearing.

4. In a type-writer, the combination with a key, a type-arm and a type-arm bearing, of motion-transmitting mechanism including an endwise-movable series of disconnected elements, a crooked conduit therefor formed in part by the type-arm bearing, and a plunger guided by the conduit and arranged to move said elements.

5. In a type-writer, the combination with a key and a type-arm, of interposed motion-transmitting mechanism including an endwise-movable series of antifriction-balls, a crooked conduit therefor formed in part by the type-arm, and a plunger extended into the conduit and operatively related to the key-lever.

6. In a type-writer, the combination with a key-lever, of a type-arm bearing, a type-arm fulcrumed therein and having a shoulder, an endwise-movable series of balls bearing against said shoulder, a crooked conduit including a tubular section extended into the bearing and constituting guiding means for the balls, and means whereby movement is imparted to the series of balls by the lever to actuate the type-arm.

7. In a type-writer, a key-lever, a type-arm bearing, a type-arm fulcrumed in the bearing and having a shoulder, an endwise-movable series of balls bearing against said shoulder, a crooked conduit constituting guiding means for the balls, and means whereby movement is imparted to the series of balls by the key-lever to actuate the type-arm.

8. In a type-writer, a type-arm, a series of motion-transmitting balls, a type-arm bearing constituting a ball-guide, and means for moving the balls to swing the type-arm.

9. In a type-writer, an oscillatory type-arm having a shoulder, an oscillatory key-lever, an interposed series of motion-transmitting balls directly engaging the type-arm shoulder, and a crooked guide for the balls.

10. In a type-writer, an oscillatory type-arm, an oscillatory key-lever, an interposed series of motion-transmitting balls, and a ball-guide formed in part by the type-arm.

11. In a type-writer, an oscillatory type-arm, a ball-guide having one end substantially straight and its opposite end curved concentric with the axis of the type-arm, a plunger disposed to reciprocate in the straight end of the guide, and a series of motion-transmitting balls located in the guide between the plunger and the type-arm.

12. In a type-writer, an oscillatory type-arm, an oscillatory key-lever, an interposed series of motion-transmitting balls, and a crooked ball-guide defined in part between the type-arm and its bearing.

13. In a type-writer, a type-arm, an endwise-movable series of disconnected motion-transmitting elements arranged to swing the type-arm, means for moving said elements, and a type-arm bearing constituting a guide for certain of the motion-transmitting elements.

14. In a type-writer, the combination with a swinging type-arm, of a key-lever, motion-transmitting mechanism between the type-arm and the rear end of the key-lever, said mechanism including an endwise-movable series of balls, a crooked conduit therefor, a plunger connected to the key-lever and extended into the conduit to urge the balls, and a lever-retracting spring interposed between the crooked conduit and the lever.

In testimony that I claim the foregoing as my own I have hereto affixed my signature in the presence of two witnesses.

ALBION ALEXANDER VANDERPOOL.

Witnesses:
    CHAS. FLINT,
    F. H. MELLINGER.